US007492889B2

(12) United States Patent
Ebenezer

(10) Patent No.: US 7,492,889 B2
(45) Date of Patent: Feb. 17, 2009

(54) NOISE SUPPRESSION BASED ON BARK BAND WIENER FILTERING AND MODIFIED DOBLINGER NOISE ESTIMATE

(75) Inventor: Samuel Ponvarma Ebenezer, Tempe, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 839 days.

(21) Appl. No.: 10/830,652

(22) Filed: Apr. 23, 2004

(65) Prior Publication Data

US 2005/0240401 A1 Oct. 27, 2005

(51) Int. Cl.
*H04M 1/00* (2006.01)
*H04M 9/00* (2006.01)

(52) U.S. Cl. ................................................ 379/392.01

(58) Field of Classification Search ............. 379/392.01
See application file for complete search history.

(56) References Cited

U.S. PATENT DOCUMENTS 3,180,936 A 4/1965 Schroeder ...................... 179/1
3,403,224 A 9/1968 Schroeder ...................... 179/1
4,630,305 A 12/1986 Borth et al. .................... 381/94
4,644,108 A * 2/1987 Crouse et al. .......... 379/406.14
4,811,404 A 3/1989 Vilmur et al. ................. 381/94
5,012,519 A 4/1991 Adlersberg et al. ........... 381/47
5,706,395 A * 1/1998 Arslan et al. ................ 704/226
5,864,794 A * 1/1999 Tasaki ..................... 704/200.1
6,097,820 A 8/2000 Turner ....................... 381/94.3
6,205,421 B1 3/2001 Morii ......................... 704/226
6,263,307 B1 7/2001 Arslan et al. ................ 704/226
6,317,709 B1 11/2001 Zack .......................... 704/225
6,415,253 B1 * 7/2002 Johnson ...................... 704/210
6,760,435 B1 * 7/2004 Etter et al. ............. 379/406.01

* cited by examiner

*Primary Examiner*—Alexander Jamal
(74) *Attorney, Agent, or Firm*—Paul F. Wille

(57) ABSTRACT

In a noise suppresser, an input signal is converted to frequency domain by discrete Fourier analysis and divided into Bark bands. Noise is estimated for each band. The circuit for estimating noise includes a smoothing filter having a slower time constant for updating the noise estimate during noise than during speech. The noise suppresser further includes a circuit to adjust a noise suppression factor inversely proportional to the signal to noise ratio of each frame of the input signal. A noise estimate is subtracted from the signal in each band. A discrete inverse Fourier transform converts the signals back to the time domain and overlapping and combined windows eliminate artifacts that may have been produced during processing.

15 Claims, 6 Drawing Sheets

NOISE SUPPRESSION BASED ON BARK BAND WIENER FILTERING AND MODIFIED DOBLINGER NOISE ESTIMATE

BACKGROUND OF THE INVENTION

This invention relates to audio signal processing and, in particular, to a circuit that uses spectral subtraction for reducing noise.

As used herein, "telephone" is a generic term for a communication device that utilizes, directly or indirectly, a dial tone from a licensed service provider. As such, "telephone" includes desk telephones (see FIG. 1), cordless telephones (see FIG. 2), speaker phones (see FIG. 3), hands free kits (see FIG. 4), and cellular telephones (see FIG. 5), among others. For the sake of simplicity, the invention is described in the context of telephones but has broader utility; e.g. communication devices that do not utilize a dial tone, such as radio frequency transceivers or intercoms.

There are many sources of noise in a telephone system. Some noise is acoustic in origin while the source of other noise is electronic, the telephone network, for example. As used herein, "noise" refers to any unwanted sound, whether or not the unwanted sound is periodic, purely random, or somewhere in-between. As such, noise includes background music, voices of people other than the desired speaker, tire noise, wind noise, and so on. Automobiles can be especially noisy environments, which makes the invention particularly useful for hands free kits.

As broadly defined, noise could include an echo of the speaker's voice. However, echo cancellation is separately treated in a telephone system and involves a comparison of the signals in two channels. This invention relates to noise suppression, which means that the apparatus operates in a single channel and in real time; i.e. one is not calculating delays as in echo cancellation.

While not universally followed, the prior art generally associates noise "suppression" with subtraction and noise "reduction" with attenuation. As used herein, noise suppression includes subtraction of one signal from another to decrease the amount of noise.

Those of skill in the art recognize that, once an analog signal is converted to digital form, all subsequent operations can take place in one or more suitably programmed microprocessors. Use of the word "signal", for example, does not necessarily mean either an analog signal or a digital signal. Data in memory, even a single bit, can be a signal.

"Efficiency" in a programming sense is the number of instructions required to perform a function. Few instructions are better or more efficient than many instructions. In languages other than machine (assembly) language, a line of code may involve hundreds of instructions. As used herein, "efficiency" relates to machine language instructions, not lines of code, because the number of instructions that can be executed per unit time determines how long it takes to perform an operation or to perform some function.

A "Bark band" or "Bark scale" refers to a generally accepted model of human hearing in which the human auditory system is analogous to a series of bandpass filters. The bandwidth of these filters increases with frequency and the precision of frequency perception decreases with increasing frequency. Several slightly different formulae are known for calculating the bands. The Bark scale includes twenty-four bands, of which only the lower eighteen bands are used in the invention because the bandwidth of a telephone system is narrower than the full range of normal human hearing. Other bands and bandwidths could be used instead for implementing the invention in other applications.

In the prior art, estimating noise power is computationally intensive, requiring either rapid calculation or sufficient time to complete a calculation. Rapid calculation requires high clock rates and more electrical power than desired, particularly in battery operated devices. Taking too much time for a calculation can lead to errors because the input signal has changed significantly during calculation.

In view of the foregoing, it is therefore an object of the invention to provide a more efficient system for noise suppression in a telephone and other communication devices.

Another object of the invention is to provide an efficient system for noise suppression that performs as well as or better than systems in the prior art.

A further object of the invention is to provide a noise suppression circuit that introduces less distortion than circuits of the prior art.

SUMMARY OF THE INVENTION

The foregoing objects are achieved in this invention in which an input signal is converted to frequency domain by discrete Fourier analysis and divided into Bark bands. Noise is estimated for each band. The circuit for estimating noise includes a smoothing filter having a slower time constant for updating the noise estimate during noise than during speech. The noise suppresser further includes a circuit to adjust a noise suppression factor inversely proportional to the signal to noise ratio of each frame of the input signal. A noise estimate is subtracted from the signal in each band. A discrete inverse Fourier transform converts the signals back to the time domain and overlapping and combined windows eliminate artifacts that may have been produced during processing.

BRIEF DESCRIPTION OF THE DRAWINGS

A more complete understanding of the invention can be obtained by considering the following detailed description in conjunction with the accompanying drawings, in which.

Because a signal can be analog or digital, a block diagram can be interpreted as hardware, software, e.g. a flow chart, or a mixture of hardware and software. Programming a microprocessor is well within the ability of those of ordinary skill in the art, either individually or in groups.

DETAILED DESCRIPTION OF THE INVENTION

Figure 1:
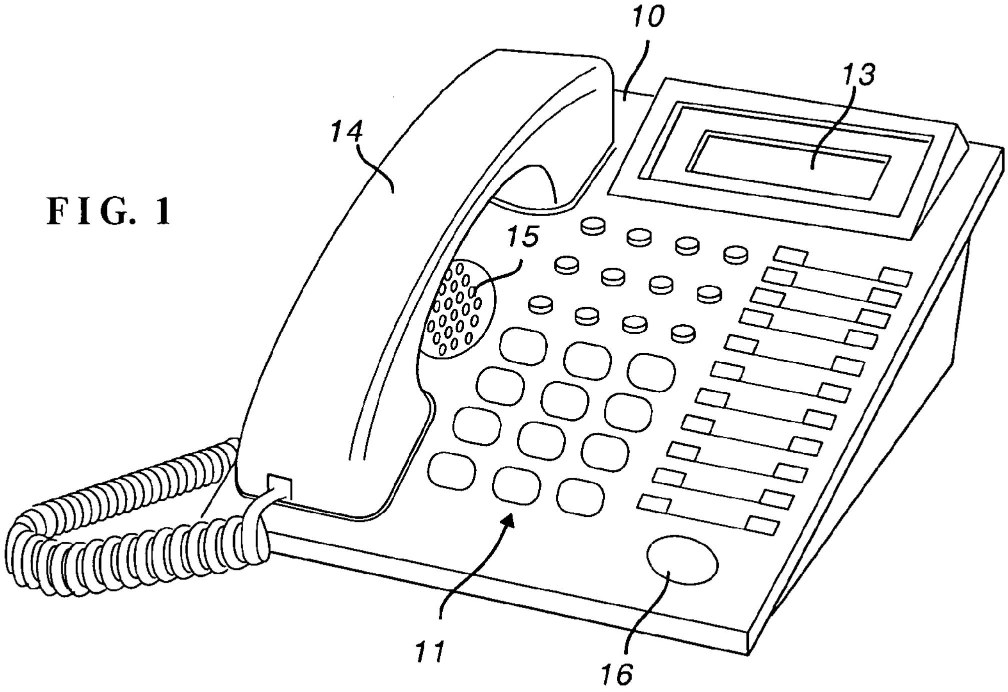
FIG. 1 is a perspective view of a desk telephone.
Figure 2:
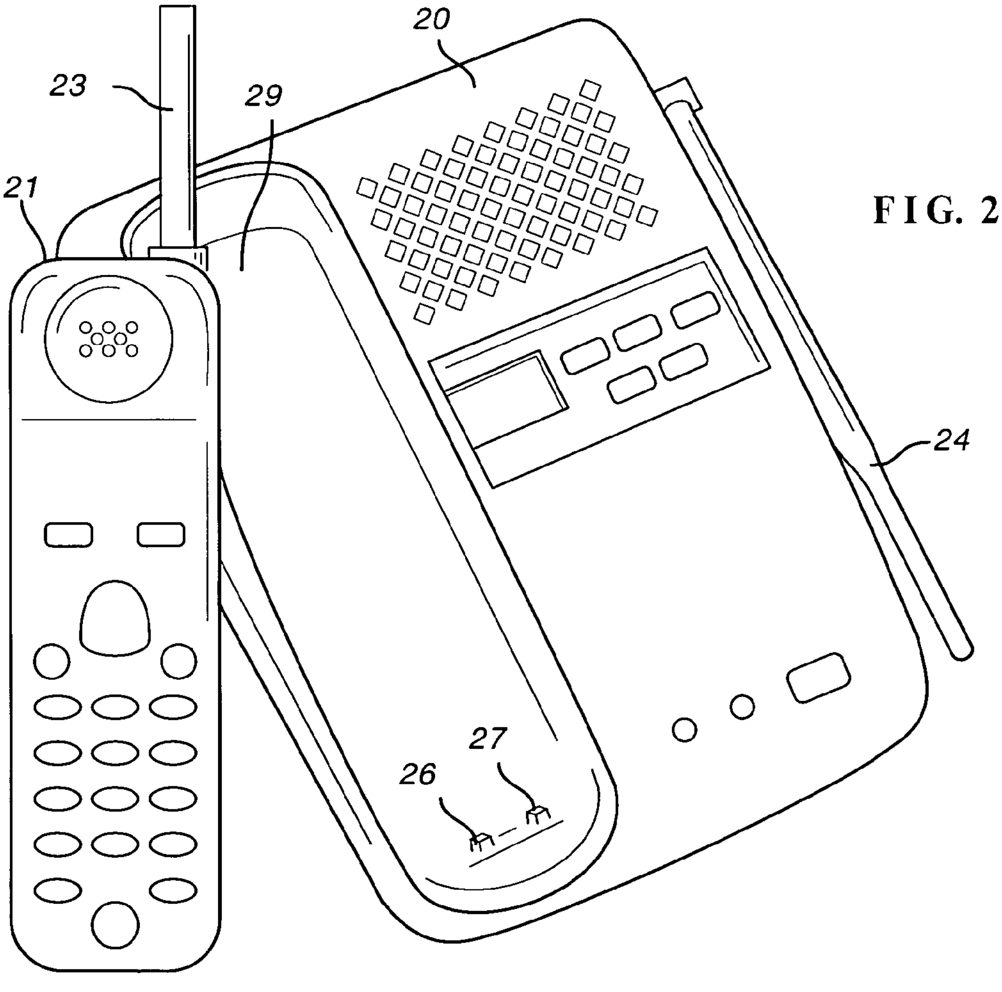
FIG. 2 is a perspective view of a cordless telephone.

This invention finds use in many applications where the internal electronics is essentially the same but the external appearance of the device is different. FIG. 1 illustrates a desk telephone including base 10, keypad 11, display 13 and handset 14. As illustrated in FIG. 1, the telephone has speaker phone capability including speaker 15 and microphone 16. The cordless telephone illustrated in FIG. 2 is similar except that base 20 and handset 21 are coupled by radio frequency signals, instead of a cord, through antennas 23 and 24. Power for handset 21 is supplied by internal batteries (not shown) charged through terminals 26 and 27 in base 20 when the handset rests in cradle 29.

Figure 3:
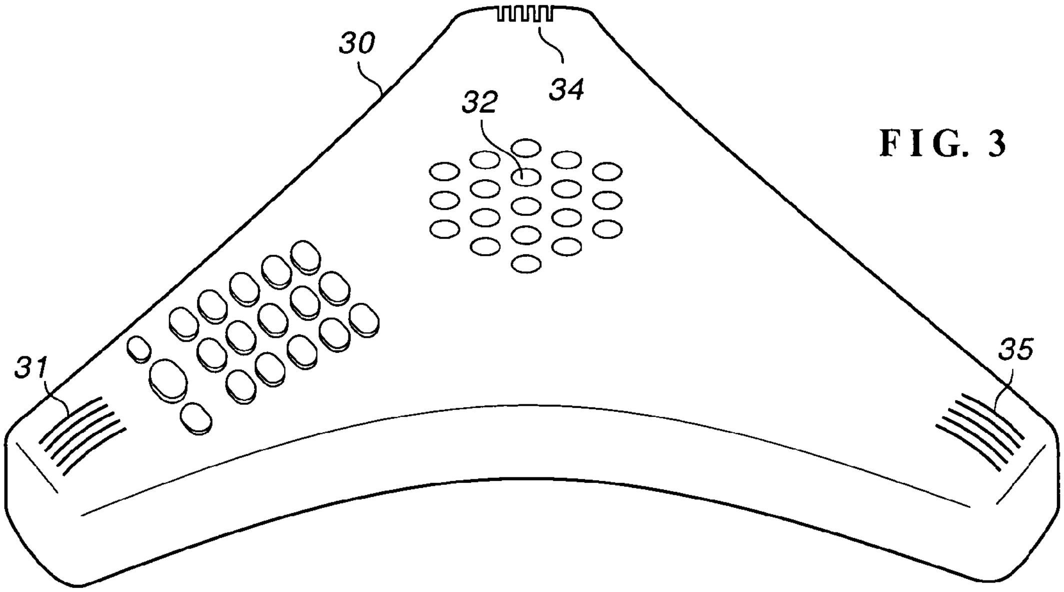
FIG. 3 is a perspective view of a conference phone or a speaker phone.

FIG. 3 illustrates a conference phone or speaker phone such as found in business offices. Telephone 30 includes microphone 31 and speaker 32 in a sculptured case. Telephone 30 may include several microphones, such as microphones 34 and 35 to improve voice reception or to provide several inputs for echo rejection or noise rejection, as disclosed in U.S. Pat. No. 5,138,651 (Sudo).

Figure 4:
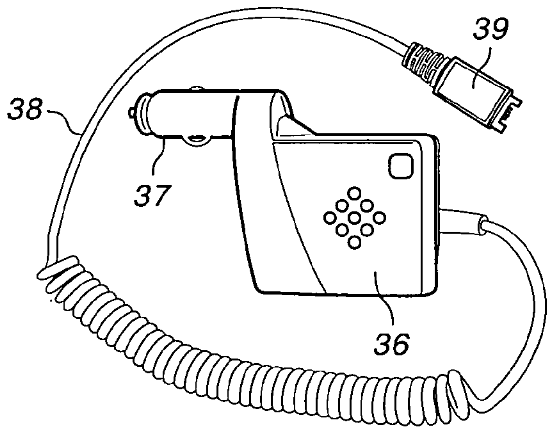
FIG. 4 is a perspective view of a hands free kit.
Figure 5:
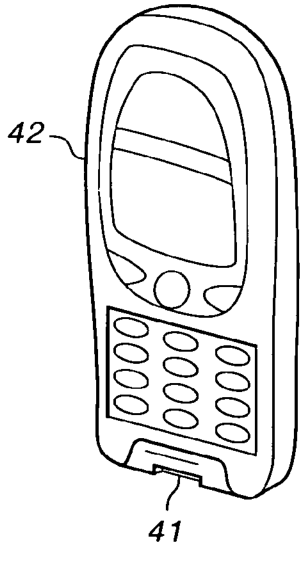
FIG. 5 is a perspective view of a cellular telephone.

FIG. 4 illustrates what is known as a hands free kit for providing audio coupling to a cellular telephone, illustrated in FIG. 5. Hands free kits come in a variety of implementations but generally include powered speaker 36 attached to plug 37, which fits an accessory outlet or a cigarette lighter socket in a vehicle. A hands free kit also includes cable 38 terminating in plug 39. Plug 39 fits the headset socket on a cellular telephone, such as socket 41 (FIG. 5) in cellular telephone 42. Some kits use RF signals, like a cordless phone, to couple to a telephone. A hands free kit also typically includes a volume control and some control switches, e.g. for going "off hook" to answer a call. A hands free kit also typically includes a visor microphone (not shown) that plugs into the kit. Audio processing circuitry constructed in accordance with the invention can be included in a hands free kit or in a cellular telephone.

Figure 6:
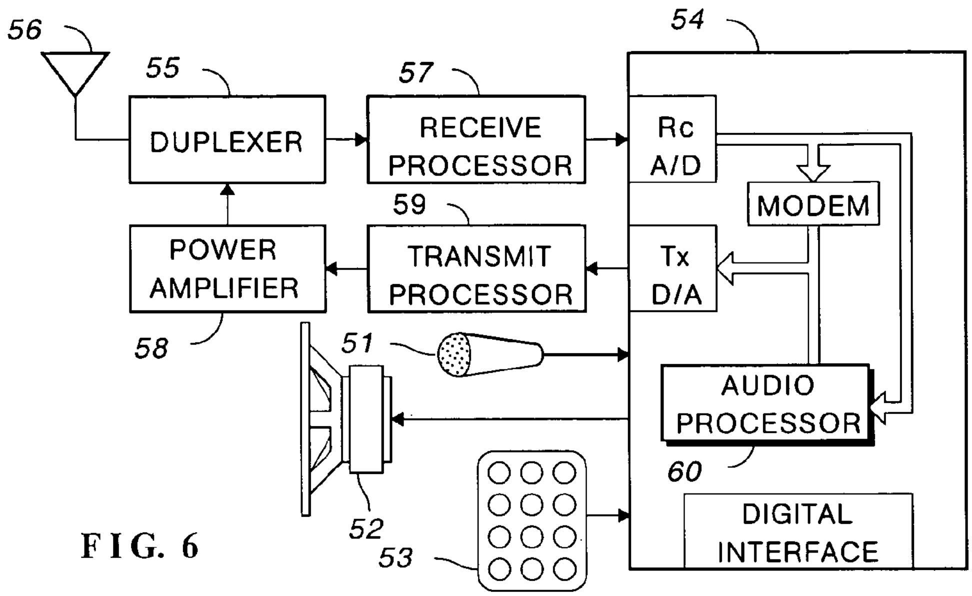
FIG. 6 is a generic block diagram of audio processing circuitry in a telephone.

The various forms of telephone can all benefit from the invention. FIG. 6 is a block diagram of the major components of a cellular telephone. Typically, the blocks correspond to integrated circuits implementing the indicated function. Microphone 51, speaker 52, and keypad 53 are coupled to signal processing circuit 54. Circuit 54 performs a plurality of functions and is known by several names in the art, differing by manufacturer. For example, Infineon calls circuit 54 a "single chip baseband IC." QualComm calls circuit 54 a "mobile station modem." The circuits from different manufacturers obviously differ in detail but, in general, the indicated functions are included.

A cellular telephone includes both audio frequency and radio frequency circuits. Duplexer 55 couples antenna 56 to receive processor 57. Duplexer 55 couples antenna 56 to power amplifier 58 and isolates receive processor 57 from the power amplifier during transmission. Transmit processor 59 modulates a radio frequency signal with an audio signal from circuit 54. In non-cellular applications, such as speakerphones, there are no radio frequency circuits and signal processor 54 may be simplified somewhat. Problems of echo cancellation and noise remain and are handled in audio processor 60. It is audio processor 60 that is modified to include the invention.

Most modern noise reduction algorithms are based on a technique known as spectral subtraction. If a clean speech signal is corrupted by an additive and uncorrelated noisy signal, then the noisy speech signal is simply the sum of the signals. If the power spectral density (PSD) of the noise source is completely known, it can be subtracted from the noisy speech signal using a Wiener filter to produce clean speech; e.g. see J. S. Lim and A. V. Oppenheim, "Enhancement and bandwidth compression of noisy speech," *Proc. IEEE*, vol. 67, pp. 1586-1604, December 1979. Normally, the noise source is not known, so the critical element in a spectral subtraction algorithm is the estimation of power spectral density (PSD) of the noisy signal.

Noise reduction using spectral subtraction can be written as $$P_s(f)=P_x(f)-P_n(f),$$

wherein $P_s(f)$ is the power spectrum of speech, $P_x(f)$ is the power spectrum of noisy speech, and $P_n(f)$ is the power spectrum of noise. The frequency response of the subtraction process can be written as follows.

$$H(f)=\sqrt{\frac{P_x(f)-\beta\hat{P}_n(f)}{P_x(f)}}$$

$\hat{P}_n(f)$ is the power spectrum of the noise estimate and $\beta$ is a spectral weighting factor based upon subband signal to noise ratio. The clean speech estimate is obtained by $$Y(f)=X(f)H(f).$$

In a single channel noise suppression system, the PSD of a noisy signal is estimated from the noisy speech signal itself, which is the only available signal. In most cases, the noise estimate is not accurate. Therefore, some adjustment needs to be made in the process to reduce distortion resulting from inaccurate noise estimates. For this reason, most methods of noise suppression introduce a parameter, $\beta$, that controls the spectral weighting factor, such that frequencies with low signal to noise ratio (S/N) are attenuated and frequencies with high S/N are not modified.

Figure 7:
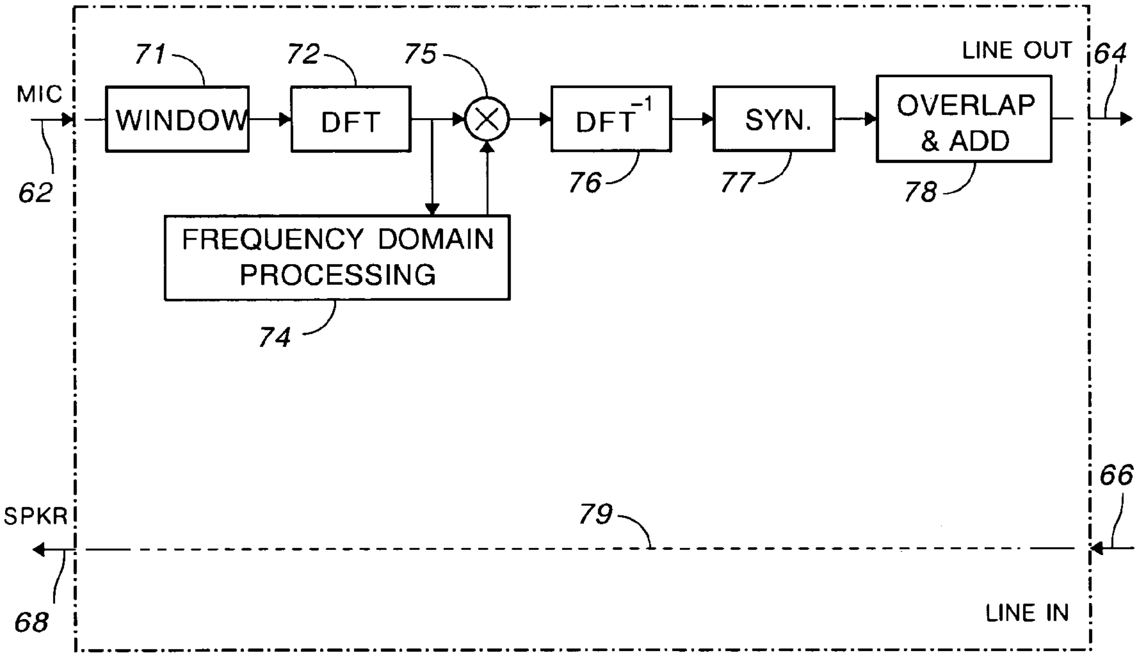
FIG. 7 is a block diagram of a noise suppresser constructed in accordance with a preferred embodiment of the invention.

FIG. 7 is a block diagram of a portion of audio processor 60 relating to a noise suppresser constructed in accordance with a preferred embodiment of the invention. In addition to noise suppression, audio processor 60 includes echo cancellation, additional filtering, and other functions, which do not relate to this invention. In the following description, the numbers in the headings relate to the blocks in FIG. 7. A second noise suppression circuit can also be coupled in the receive channel, between line input 66 and speaker output 68, represented by dashed line 79.

71—Analysis Window

The noise reduction process is performed by processing blocks of information. The size of the block is one hundred twenty-eight samples, for example. In one embodiment of the invention, the input frame size is thirty-two samples. Hence, the input data must be buffered for processing. A buffer of size one hundred twenty-eight words is used before windowing the input data.

The buffered data is windowed to reduce the artifacts introduced by block processing in the frequency domain. Different window options are available. The window selection is based on different factors, namely the main lobe width, side lobes levels, and the overlap size. The type of window used in the pre-processing influences the main lobe width and the side lobe levels. For example, the Hanning window has a broader main lobe and lower side lobe levels as compared to a rectangular window. Several types of windows are known in the art and can be used, with suitable adjustment in some parameters such as gain and smoothing coefficients.

The artifacts introduced by frequency domain processing are exacerbated further if less overlap is used. However, if more overlap is used, it will result in an increase in computational requirements. Using a synthesis window reduces the artifacts introduced at the reconstruction stage. Considering all the above factors, a smoothed, trapezoidal analysis window and a smoothed, trapezoidal synthesis window, each with twenty-five percent overlap, are used. For a 128-point discrete Fourier transform, a twenty-five percent overlap means that the last thirty-two samples from the previous frame are used as the first (oldest) thirty-two samples for the current frame.

D, the size of the overlap, equals $(2 \cdot D_{ana} - D_{syn})$. If $D_{ana}$ equals 24 and $D_{syn}$ equals 16, then D=32. The analysis window, $W_{ana}(n)$, is given by the following.

$$\left(\frac{n+1}{D_{ana}+1}\right) \text{for } 0 \le n < D_{ana},$$

$$1 \text{ for } D_{ana} \le n < 128 - D_{ana}, \text{ and}$$

$$\left(\frac{128-n}{D_{ana}+1}\right) \text{for } 128 - D_{ana} \le n < 128$$

The synthesis window, $W_{syn}(n)$, is given by the following.

$$0 \text{ for } 0 \le n < (D_{ana} - D_{syn})$$

$$\left(\frac{D_{ana}+1}{D-n}\right) * \left(\frac{D_{ana}-n}{D_{syn}+1}\right) \text{for } (D_{ana} - D_{syn}) \le n < D_{ana}$$

$$1 \text{ for } D_{ana} \le n < 128 - D_{ana}$$

$$\left(\frac{D_{ana}+1}{n-(128-D-1)}\right) * \left(\frac{n-(128-D_{ana}-1)}{D_{syn}+1}\right) \text{for}$$

$$128 - D_{ana} \le n < 128 - (D_{ana} - D_{syn}), \text{ and}$$

$$0 \text{ for } 128 - (D_{ana} - D_{syn}) \le n < 128$$

The central interval is the same for both windows. For perfect reconstruction, the analysis window and the synthesis window satisfy the following condition.

$$W_{ana}(n) W_{syn}(n) + W_{ana}(n+128-D) W_{syn}(n+128-D) = 1$$

in the interval $0 \leqq n < D$ and $$W_{ana}(n) W_{syn}(n) = 1$$

in the interval $D \leqq n < 96$.

The buffered data is windowed using the analysis window $$x_w(m,n) = x(m,n) * W_{ana}(n)$$

where x(m,n) is the buffered data at frame m.

72—Forward Discrete Fourier Transform (DFT)

The windowed time domain data is transformed to the frequency domain using the discrete Fourier transform given by the following transform equation.

$$X(m,k) = \frac{2}{N} \sum_{n=0}^{N-1} x_w(m,n) \exp\left(\frac{-j2\pi nk}{N}\right), k = 0, 1, 2, \ldots, (N-1)$$

where $x_w(m,n)$ is the windowed time domain data at frame m and X(m,k) is the transformed data at frame m and N is the size of DFT. Since the input time domain data is real, the output of DFT is normalized by a factor N/2.

74—Frequency Domain Processing

Figure 8:
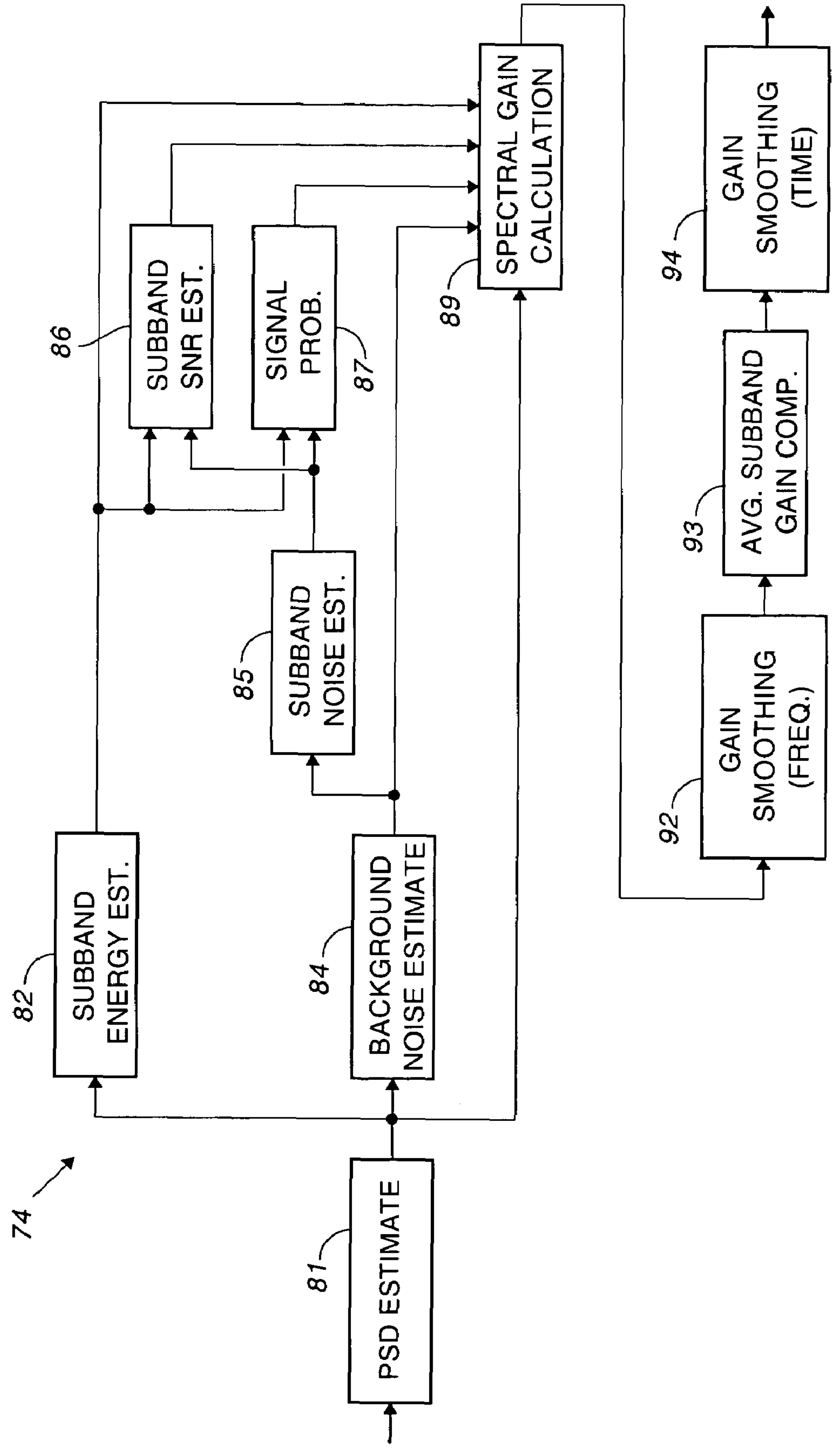
FIG. 8 is a block diagram of a circuit for calculating noise constructed in accordance with the invention.

The frequency response of the noise suppression circuit is calculated and has several aspects that are illustrated in the block diagram of FIG. 8. In the following description, the heading numbers refer to blocks in FIG. 8.

81—Power Spectral Density (PSD) Estimation

The power spectral density of the noisy speech is approximated using a first-order recursive filter defined as follows.

$$P_x(m,k) = \epsilon_s P_x(m-1,k) + (1-\epsilon_s)|X(m,k)|^2$$

where $P_x(m,k)$ is the power spectral density of the noisy speech at frame m and $P_x(m-1,k)$ is the power spectral density of the noisy speech at frame m−1. $|X(m,k)|^2$ is the magnitude spectrum of the noisy speech at frame m and k is the frequency index. $\epsilon_s$ is a spectral smoothing factor.

82—Bark Bank Energy Estimation

Subband based signal analysis is performed to reduce spectral artifacts that are introduced during the noise reduction process. The subbands are based on Bark bands (also called "critical bands"), which model the perception of a human ear. The band edges and the center frequencies of Bark bands in the narrow band speech spectrum are shown in the following Table.

| Band No. | Range (Hz) | Center Freq. (Hz) |
|---|---|---|
| 1 | 0-100 | 50 |
| 2 | 100-200 | 150 |
| 3 | 200-300 | 250 |
| 4 | 300-400 | 350 |
| 5 | 400-510 | 450 |
| 6 | 510-630 | 570 |
| 7 | 630-770 | 700 |
| 8 | 770-920 | 840 |
| 9 | 920-1080 | 1000 |
| 10 | 1080-1270 | 1175 |
| 11 | 1270-1480 | 1370 |
| 12 | 1480-1720 | 1600 |
| 13 | 1720-2000 | 1850 |
| 14 | 2000-2320 | 2150 |
| 15 | 2320-2700 | 2500 |
| 16 | 2700-3150 | 2900 |
| 17 | 3150-3700 | 3400 |
| 18 | 3700-4400 | 4000 |

The DFT of the noisy speech frame is divided into 17 Bark bands. For a 128-point DFT, the spectral bin numbers corresponding to each Bark band is shown in the following table.

| Band No. | Freq. Range (Hz) | Spectral Bin Number | No. of points |
|---|---|---|---|
| 1 | 0-125 | 0, 1, 2 | 3 |
| 2 | 187.5-250 | 3, 4 | 2 |
| 3 | 312.5-375 | 5, 6 | 2 |
| 4 | 437.5-500 | 7, 8 | 2 |
| 5 | 562.5-625 | 9, 10 | 2 |
| 6 | 687.5-750 | 11, 12 | 2 |
| 7 | 812.5-875 | 13, 14 | 2 |
| 8 | 937.5-1062.5 | 15, 16, 17 | 3 |
| 9 | 1125-1250 | 18, 19, 20 | 3 |
| 10 | 1312.5-1437.5 | 21, 22, 23 | 3 |
| 11 | 1500-1687.5 | 24, 25, 26, 27 | 4 |
| 12 | 1750-2000 | 28, 29, 30, 31, 32 | 5 |
| 13 | 2062.5-2312.5 | 33, 34, 35, 36, 37 | 5 |
| 14 | 2375-2687.5 | 38, 39, 40, 41, 42, 43 | 6 |
| 15 | 2750-3125 | 44, 45, 46, 47, 48, 49, 50 | 7 |
| 16 | 3187.5-3687.5 | 51, 52, 53, 54, 55, 56, 57, 58, 59 | 9 |
| 17 | 3750-4000 | 60, 61, 62, 63, 64 | 5 |

The energy of noisy speech in each Bark band is calculated as follows.

$$E_x(m, i) = \sum_{k=f_L(i)}^{f_H(i)} P_x(m, k)$$

The energy of the noise in each Bark band is calculated as follows.

$$E_n(m, i) = \sum_{k=f_L(i)}^{f_H(i)} P_n(m, k)$$

where $f_H(i)$ and $f_L(i)$ are the spectral bin numbers corresponding to highest and lowest frequency respectively in Bark band i and $P_x(m,k)$ and $P_n(m,k)$ are the power spectral density of the noisy speech and noise estimate respectively.

84—Noise Estimation

Rainer Martin was an early proponent of noise estimation based on minimum statistics; see "Spectral Subtraction Based on Minimum Statistics," *Proc. 7th European Signal Processing Conf.,* EUSIPCO-94, Sep. 13-16, 1994, pp. 1182-1185. This method does not require a voice activity detector to find pauses in speech to estimate background noise. This algorithm instead uses a minimum estimate of power spectral density within a finite time window to estimate the noise level. The algorithm is based on the observation that an estimate of the short term power of a noisy speech signal in each spectral bin exhibits distinct peaks and valleys over time. To obtain reliable noise power estimates, the data window, or buffer length, must be long enough to span the longest conceivable speech activity, yet short enough for the noise to remain approximately stationary. The noise power estimate $P_n(m,k)$ is obtained as a minimum of the short time power estimate $P_x(m,k)$ within a window of M subband power samples. To reduce the computational complexity of the algorithm and to reduce the delay, the data to one window of length M is decomposed into w windows of length l such that l*w=M.

Even though using a sub-window based search for minimum reduces the computational complexity of Martin's noise estimation method, the search requires large amounts of memory to store the minimum in each sub-window for every subband. Gerhard Doblinger has proposed a computationally efficient algorithm that tracks minimum statistics; see G. Doblinger, "Computationally efficient speech enhancement by spectral minima tracking in subbands," *Proc. 4th European Conf. Speech, Communication and Technology,* EUROSPEECH'95, Sep. 18-21, 1995, pp. 1513-1516. The flow diagram of this algorithm is shown in thinner line in FIG. 9. According to this algorithm, when the present (frame m) value of the noisy speech spectrum is less than the noise estimate of the previous frame (frame m−1), then the noise estimate is updated to the present noisy speech spectrum.

Figure 9:
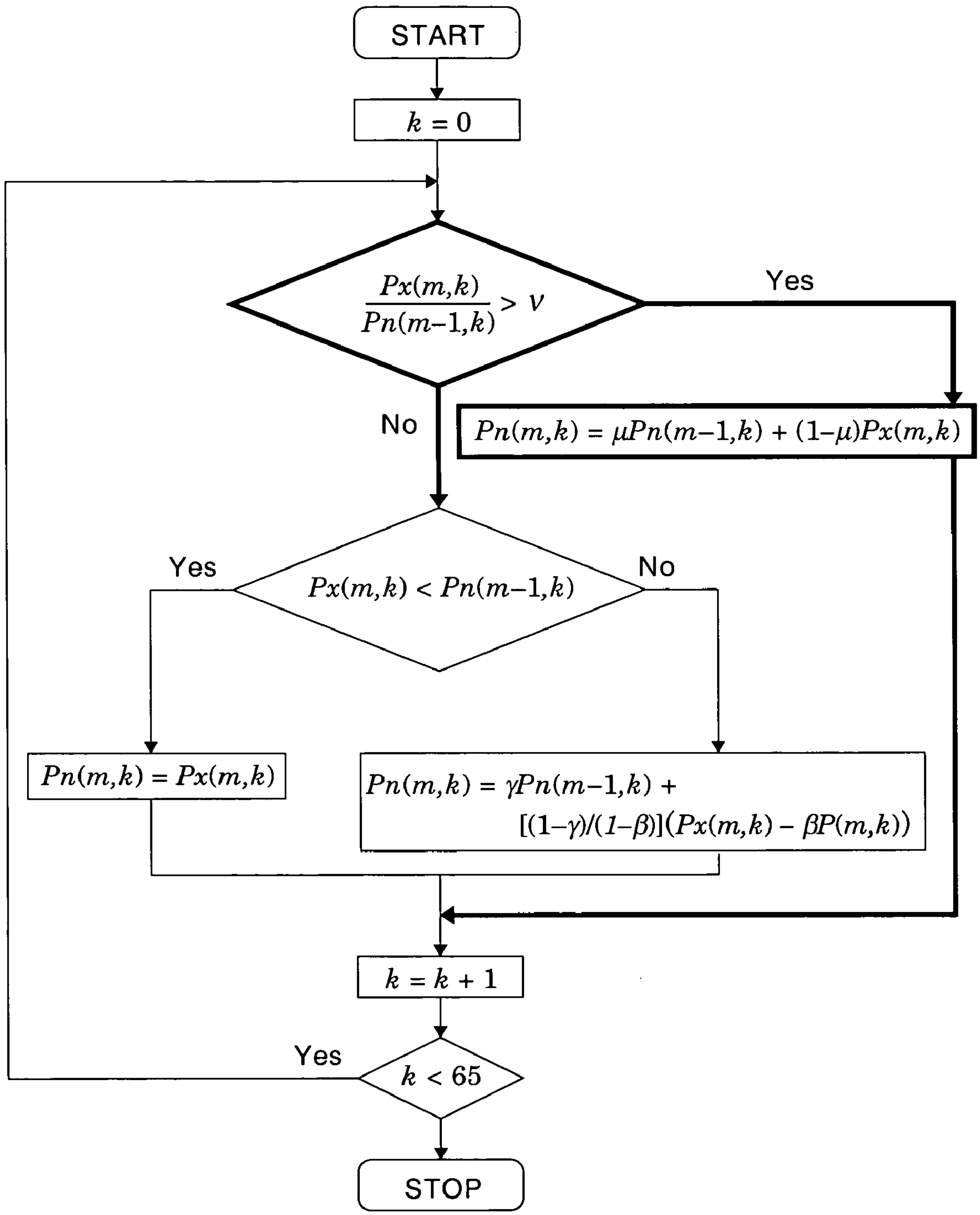
FIG. 9 is a flow chart illustrating a process for calculating a modified Doblinger noise estimate in accordance with the invention.

Otherwise, the noise estimate for the present frame is updated by a first-order smoothing filter. This first-order smoothing is a function of present noisy speech spectrum $P_x(m,k)$, noisy speech spectrum of the previous frame $P_x(m-1,k)$, and the noise estimate of the previous frame $P_n(m-1,k)$. The parameters β and γ in FIG. 9 are used to adjust to short-time stationary disturbances in the background noise. The values of β and γ used in the algorithm are 0.5 and 0.995, respectively, and can be varied.

Doblinger's noise estimation method tracks minimum statistics using a simple first-order filter requiring less memory. Hence, Doblinger's method is more efficient than Martin's minimum statistics algorithm. However, Doblinger's method overestimates noise during speech frames when compared with the Martin's method, even though both methods have the same convergence time. This overestimation of noise will distort speech during spectral subtraction.

In accordance with the invention, Doblinger's noise estimation method is modified by the additional test inserted in the process, indicated by the thicker lines in FIG. 9. According to the modification, if the present noisy speech spectrum deviates from the noise estimate by a large amount, then a first-order exponential averaging smoothing filter with a very slow time constant is used to update the noise estimate of the present frame. The effect of this slow time constant filter is to reduce the noise estimate and to slow down the change in estimate.

The parameter μ in FIG. 9 controls the convergence time of the noise estimate when there is a sudden change in background noise. The higher the value of parameter μ, the slower the convergence time and the smaller is the speech distortion. Hence, tuning the parameter μ is a tradeoff between noise estimate convergence time and speech distortion. The parameter ν controls the deviation threshold of the noisy speech spectrum from the noise estimate. In one embodiment of the invention, ν had a value of 3. Other values could be used instead. A lower threshold increases convergence time. A higher threshold increases distortion. A range of 1-9 is believed usable but the limits are not critical.

89—Spectral Gain Calculation

Modified Wiener Filtering

Various sophisticated spectral gain computation methods are available in the literature. See, for example, Y. Ephraim and D. Malah, "Speech enhancement using a minimum mean-square error short-time spectral amplitude estimator," *IEEE Trans. Acoust. Speech, Signal Processing*, vol. ASSP-32, pp. 1109-1121, December 1984; Y. Ephraim and D. Malah, "Speech enhancement using a minimum mean-square error log-spectral amplitude estimator," *IEEE Trans. Acoust. Speech, Signal Processing*, vol. ASSP-33 (2), pp. 443-445, April 1985; and I. Cohen, "On speech enhancement under signal presence uncertainty," *Proceedings of the 26th IEEE International Conference on Acoustics, Speech, and Signal Processing*, ICASSP-01, Salt Lake City, Utah, pp. 7-11, May 2001.

A closed form of spectral gain formula minimizes the mean square error between the actual spectral amplitude of speech and an estimate of the spectral amplitude of speech. Another closed form spectral gain formula minimizes the mean square error between the logarithm of actual amplitude of speech and the logarithm of estimated amplitude of speech. Even though these algorithms may be optimum in a theoretical sense, the actual performance of these algorithms is not commercially viable in very noisy conditions. These algorithms produce musical tone artifacts that are significant even in moderately noisy environments. Many modified algorithms have been derived from the two outlined above.

It is known in the art to calculate spectral gain as a function of signal to noise ratio based on generalized Wiener filtering; see L. Arslan, A. McCree, V. Viswanathan, "New methods for adaptive noise suppression," *Proceedings of the 26th IEEE International Conference on Acoustics, Speech, and Signal*

*Processing*, ICASSP-01, Salt Lake City, Utah, pp. 812-815, May 2001. The generalized Wiener filter is given by $$H(m,k)=\sqrt{\frac{\hat{P}s(m,k)}{\hat{P}s(m,k)+\alpha\hat{P}n(m,k)}}$$

where $\hat{P}s(m,k)$ is the clean speech power spectrum estimate, $\hat{P}n(m,k)$ is the power spectrum of the noise estimate and $\alpha$ is the noise suppression factor. There are many ways to estimate the clean speech spectrum. For example, the clean speech spectrum can be estimated as a linear predictive coding model spectrum. The clean speech spectrum can also be calculated from the noisy speech spectrum Px(m,k) with only a gain modification.

$$\hat{P}s(m,k)=\left(\frac{Ex(m)-En(m)}{En(m)}\right)Px(m,k)$$

where Ex(m) is the noisy speech energy in frame m and En(m) is the noise energy in frame m. Signal to noise ratio, SNR, is calculated as follows.

$$SNR(m)=\left(\frac{Ex(m)-En(m)}{En(m)}\right)$$

Substituting the above equations in the generalized Wiener filter formula, one gets $$H(m,k)=\sqrt{\frac{Px(m,k)}{Px(m,k)+\frac{\alpha'\hat{P}n(m,k)}{SNR(m)}}}$$

where SNR(m) is the signal to noise ratio in frame number m and $\alpha'$ is the new noise suppression factor equal to $(E_x(m)/E_n(m))\alpha$. The above formula ensures stronger suppression for noisy frames and weaker suppression during voiced speech frames because H(m,k) varies with signal to noise ratio.

Bark Band Based Modified Wiener Filtering

The modified Wiener filter solution is based on the signal to noise ratio of the entire frame, m. Because the spectral gain function is based on the signal to noise ratio of the entire frame, the spectral gain value will be larger during a frame of voiced speech and smaller during a frame of unvoiced speech. This will produce "noise pumping", which sounds like noise being switched on and off. To overcome this problem, in accordance with another aspect of the invention, Bark band based spectral analysis is performed. Signal to noise ratio is calculated in each band in each frame, as follows.

$$SNR(m,i)=\left(\frac{Ex(m,i)-En(m,i)}{En(m,i)}\right),$$

where Ex(m,i) and En(m,i) are the noisy speech energy and noise energy, respectively, in band i at frame m. Finally, the Bark band based spectral gain value is calculated by using the Bark band SNR in the modified Wiener solution.

$$H(m,f(i,k))=\sqrt{\frac{Px(m,f(i,k))}{Px(m,f(i,k))+\frac{\alpha'(i)\hat{P}n(m,f(i,k))}{SNR(m,i)}}},$$

$$f_L(i)\le f(i,k)\le f_H(i)$$

where $f_L(i)$ and $f_H(i)$ are the spectral bin numbers of the highest and lowest frequency respectively in Bark band i.

One of the drawbacks of spectral subtraction based methods is the introduction of musical tone artifacts. Due to inaccuracies in the noise estimation, some spectral peaks will be left as a residue after spectral subtraction. These spectral peaks manifest themselves as musical tones. In order to reduce these artifacts, the noise suppression factor $\alpha'$ must be kept at a higher value than calculated above. However, a high value of $\alpha'$ will result in more voiced speech distortion. Tuning the parameter $\alpha'$ is a tradeoff between speech amplitude reduction and musical tone artifacts. This leads to a new mechanism to control the amount of noise reduction during speech The idea of utilizing the uncertainty of signal presence in the noisy spectral components for improving speech enhancement is known in the art; see R. J. McAulay and M. L. Malpass, "Speech enhancement using a soft-decision noise suppression filter," *IEEE Trans. Acoust., Speech, Signal Processing*, vol ASSP-28, pp. 137-145, April 1980. After one calculates the probability that speech is present in a noisy environment, the calculated probability is used to adjust the noise suppression factor, $\alpha$.

Figure 10:
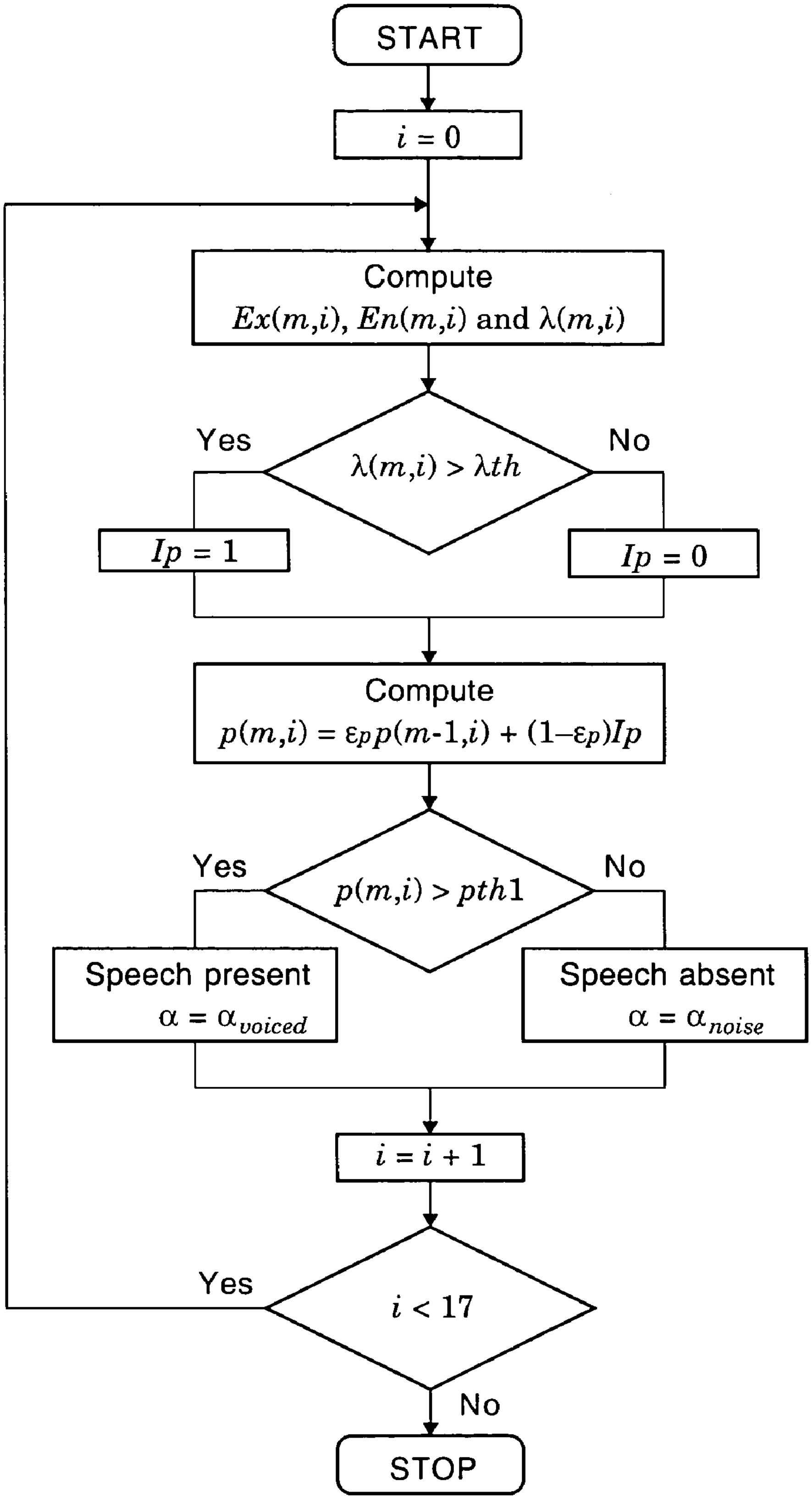
FIG. 10 is a flow chart illustrating a process for estimating the presence or absence of speech in noise and setting a gain coefficient accordingly.

One way to detect voiced speech is to calculate the ratio between the noisy speech energy spectrum and the noise energy spectrum. If this ratio is very large, then we can assume that voiced speech is present. In accordance with another aspect of the invention, the probability of speech being present is computed for every Bark band. This Bark band analysis results in computational savings with good quality of speech enhancement. The first step is to calculate the ratio $$\lambda(m,i)=\frac{E_x(m,i)}{E_n(m,i)},$$

where $E_x(m,i)$ and $E_n(m,i)$ have the same definitions as before. The ratio is compared with a threshold, $\lambda_{th}$, to decide whether or not speech is present. Speech is present when the threshold is exceeded; see FIG. 10.

The speech presence probability is computed by a first-order, exponential, averaging (smoothing) filter.

$$p(m,i)=\epsilon_p p(m-1,i)+(1-\epsilon_p)I_p$$

where $\epsilon_p$ is the probability smoothing factor and $I_p$ equals one when speech is present and equals zero when speech is absent. The correlation of speech presence in consecutive frames is captured by the filter.

The noise suppression factor, $\alpha$, is determined by comparing the speech presence probability with a threshold, $p_{th}$. Specifically, a is set to a lower value if the threshold is exceeded than when the threshold is not exceeded. Again, note that the factor is computed for each band.

Spectral Gain Limiting

Spectral gain is limited to prevent gain from going below a minimum value, e.g. −20 dB. The system is capable of less gain but is not permitted to reduce gain below the minimum. The value is not critical. Limiting gain reduces musical tone artifacts and speech distortion that may result from finite precision, fixed point calculation of spectral gain.

The lower limit of gain is adjusted by the spectral gain calculation process. If the energy in a Bark band is less than some threshold, $E_{th}$, then minimum gain is set at −1 dB. If a segment is classified as voiced speech, i.e., the probability exceeds $p_{th}$, then the minimum gain is set to −1 dB. If neither condition is satisfied, then the minimum gain is set to the lowest gain allowed, e.g. −20 dB. In one embodiment of the invention, a suitable value for $E_{th}$ is 0.01. A suitable value for $p_{th}$ is 0.1. The process is repeated for each band to adjust the gain in each band.

Spectral Gain Smoothing

In all block-transform based processing, windowing and overlap-add are known techniques for reducing the artifacts introduced by processing a signal in blocks in the frequency domain. The reduction of such artifacts is affected by several factors, such as the width of the main lobe of the window, the slope of the side lobes in the window, and the amount of overlap from block to block. The width of the main lobe is influenced by the type of window used. For example, a Hanning (raised cosine) window has a broader main lobe and lower side lobe levels than a rectangular window.

Controlled spectral gain smoothes the window and causes a discontinuity at the overlap boundary during the overlap and add process. This discontinuity is caused by the time-varying property of the spectral gain function. To reduce this artifact, in accordance with the invention, the following techniques are employed: spectral gain smoothing along a frequency axis, averaged Bark band gain (instead of using instantaneous gain values), and spectral gain smoothing along a time axis.

92—Gain Smoothing Across Frequency

In order to avoid abrupt gain changes across frequencies, the spectral gains are smoothed along the frequency axis using the exponential averaging smoothing filter given by $$H'(m,k)=\epsilon_{gf}H'(m,k-1)+(1-\epsilon_{gf})H(m,k)$$

where $\epsilon_{gf}$ is the gain smoothing factor across frequency, H(m, k) is the instantaneous spectral gain at spectral bin number k, H'(m,k−1) is the smoothed spectral gain at spectral bin number k−1, and H'(m,k) is the smoothed spectral gain at spectral bin number k.

93—Average Bark Band Gain Computation

Abrupt changes in spectral gain are further reduced by averaging the spectral gains in each Bark band. This implies that all the spectral bins in a Bark band will have the same spectral gain, which is the average among all the spectral gains in that Bark band. The average spectral gain in a band, $H'_{avg}(m,k)$, is simply the sum of the gains in a band divided by the number of bins in the band. Because the bandwidth of the higher frequency bands is wider than the bandwidths of the lower frequency bands, averaging the spectral gain is not as effective in reducing narrow band noise in the higher bands as in the lower bands. Therefore, averaging is performed only for the bands having frequency components less than approximately 1.35 kHz. The limit is not critical and can be adjusted empirically to suit taste, convenience, or other considerations.

94—Gain Smoothing Across Time

In a rapidly changing, noisy environment, a low frequency noise flutter will be introduced in the enhanced output speech. This flutter is a by-product of most spectral subtraction based, noise reduction systems. If the background noise changes rapidly and the noise estimation is able to adapt to the rapid changes, the spectral gain will also vary rapidly, producing the flutter. The low frequency flutter is reduced by smoothing the spectral gain, H"(m,k) across time using a first-order exponential averaging smoothing filter given by $$H''(m,k)=\epsilon_{gt}H''(m-1,k)+(1-\epsilon_{gt})'_{avg}(m,b(i)) \text{ for } f(k) < 1.35 \text{ kHz, and}$$

$$H''(m,k)=\epsilon_{gt}H''(m-1,k)+(1-\epsilon_{gt})H'(m,k) \text{ for } f(k) \geqq 1.35 \text{ kHz,}$$

where f(k) is the center frequency of Bark band k, $\epsilon_{gt}$ is the gain smoothing factor across time, b(i) is the Bark band number of spectral bin k, H'(m,k) is the smoothed (across frequency) spectral gain at frame index m, H'(m−1,k) is the smoothed (across frequency) spectral gain at frame index m−1, and $H'_{avg}(m,k)$ is the smoothed (across frequency) and averaged spectral gain at frame index m.

Smoothing is sensitive to the parameter $\epsilon_{gt}$ because excessive smoothing will cause an tail-end echo (reverberation) or noise pumping in the speech. There also can be significant reduction in speech amplitude if gain smoothing is set too high. A value of 0.1-0.3 is suitable for $\epsilon_{gt}$. As with other values given, a particular value depends upon how a signal was processed prior to this operation; e.g. gains used.

76—Inverse Discrete Fourier Transform

The clean speech spectrum is obtained by multiplying the noisy speech spectrum with the spectral gain function in block 75. This may not seem like subtraction but recall the initial development given above, which concluded that the clean speech estimate is obtained by $$Y(f)=X(f)H(f).$$

The subtraction is contained in the multiplier H(f).

The clean speech spectrum is transformed back to time domain using the inverse discrete Fourier transform given by the transform equation $$s(m,n)=\sum_{k=0}^{N-1} X(m,k)H(m,k)\exp\left(\frac{j2\pi nk}{N}\right),\ n=0,1,2,3\ldots,N-1$$

where X(m,k)H(m,k) is the clean speech spectral estimate and s(m,n) is the time domain clean speech estimate at frame m.

77—Synthesis Window

The clean speech is windowed using the synthesis window to reduce the blocking artifacts.

$$s_w(m,n)=s(m,n)*W_{syn}(n)$$

78—Overlap and Add

Finally, the windowed clean speech is overlapped and added with the previous frame, as follows.

$$y(m,n)=\begin{cases} s_w(m-1,128-D+n)+s_w(m,n) & 0 \le n < D \\ s_w(m,n) & D \le n < 128 \end{cases}$$

where $s_w(m-1, \ldots)$ is the windowed clean speech of the previous frame, $s_w(m,n)$ is the windowed clean speech of the present frame and D is the amount of overlap, which, as described above, is 32 in one embodiment of the invention.

The invention thus provides improved noise suppression using a modified Doblinger noise estimate, subband based Wiener filtering, subband gain computation, SNR adjusted gain in each subband, gain smoothing, and twenty-five percent overlap of trapezoidal windows. The combination reduces computation to low MIPS (less than 2 MIPS using a Texas Instruments C55xx processor and less than 1 MIPS on a Motorola Starcore SC140 using less than 2 k of data memory) compared to approximately five MIPS for the prior art. In addition there are fewer musical tone artifacts and no noticeable change in residual background noise after suppression.

Having thus described the invention, it will be apparent to those of skill in the art that various modifications can be made within the scope of the invention. For example, the use of the Bark band model is desirable but not necessary. The band pass filters can follow other patterns of progression.

What is claimed as the invention is:

1. In a noise suppression circuit including a circuit for calculating a noise estimate, a circuit for subtracting the noise estimate from an input signal, and a synthesis circuit for combining frames into an output signal, the improvement comprising:

- a plurality of band pass filters for dividing an input signal into a plurality of bands;
- means for detecting speech in each band;
- an analysis circuit for dividing the signal from each filter into a plurality of frames with each frame containing a plurality of samples;
- means for calculating a noise suppression factor inversely proportional to the signal to noise ratio of each frame in each band.

2. The noise suppression circuit as set forth in claim 1 wherein said band pass filters define Bark bands.

3. The noise suppression circuit as set forth in claim 2 and further including a circuit for limiting spectral gain in said circuit for calculating a noise estimate.

4. The noise suppression circuit as set forth in claim 3 and further including a speech detector, wherein the spectral gain limit is higher when speech is detected than when speech is not detected.

5. The noise suppression circuit as set forth in claim 3 and further including a first smoothing circuit coupled to said circuit for calculating a noise estimate, wherein said first smoothing circuit smoothes gain across the frequency spectrum of the input signal.

6. The noise suppression circuit as set forth in claim 5 wherein said first smoothing circuit smoothes gain across bands below approximately 2 kHz.

7. The noise suppression circuit as set forth in claim 1 wherein said circuit for calculating a noise estimate includes:

- a smoothing filter for updating the noise estimate of a frame, said smoothing filter having a time constant that increases when a noisy speech spectrum deviates from a noise estimate by more than a predetermined amount and decreases when the noisy speech spectrum deviates from the noise estimate by less than the predetermined amount, thereby slowing the change in estimate from frame to frame when a noisy speech spectrum deviates from a noise estimate by more than a predetermined amount.

8. The noise suppression circuit as set forth in claim 7 wherein said filter is a first-order exponential averaging smoothing filter.

9. In a noise suppression circuit including an analysis circuit for dividing an input signal into a plurality of frames, each frame containing a plurality of samples, a circuit for calculating a noise estimate, a circuit for subtracting the noise estimate from the input signal, and a synthesis circuit for reconstructing the frames into an output signal, the improvement comprising:

- a smoothing filter in said circuit for calculating a noise estimate, said smoothing filter having a time constant for updating the noise estimate of a frame, wherein said time constant increases when a noisy speech spectrum deviates from a noise estimate by more than a predetermined amount and said time constant decreases when the noisy speech spectrum deviates from the noise estimate by less than the predetermined amount, thereby slowing the change in estimate from frame to frame when a noisy speech spectrum deviates from a noise estimate by more than a predetermined amount.

10. The noise suppression circuit as set forth in claim 9 and further including a circuit to adjust a noise suppression factor inversely proportional to the signal to noise ratio of each frame.

11. The noise suppression circuit as set forth in claim 10 and further including a circuit for calculating a discrete Fourier transform of each frame of the input signal to convert each frame to frequency domain.

12. The noise suppression circuit as set forth in claim 11 wherein said circuit for calculating a discrete Fourier transform divides the frame into a plurality of bands of progressively higher center frequency.

13. The noise suppression circuit as set forth in claim 12 wherein said bands are Bark bands.

14. A telephone having an audio processing circuit including a receive channel and a transmit channel, wherein the improvement comprises a noise suppression circuit as set forth in claim 1 in at least one of said channels.

15. A telephone having an audio processing circuit including a receive channel and a transmit channel, wherein the improvement comprises a noise suppression circuit as set forth in claim 9 in at least one of said channels.

* * * * *